United States Patent
Kang et al.

(10) Patent No.: US 7,110,069 B2
(45) Date of Patent: Sep. 19, 2006

(54) LIQUID CRYSTAL DISPLAY WITH TWO SURFACE DISPLAY FUNCTION

(75) Inventors: Sung Gu Kang, Kyoungju-shi (KR); Seung Jun Moon, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 11/081,672

(22) Filed: Mar. 17, 2005

(65) Prior Publication Data

US 2005/0156558 A1  Jul. 21, 2005

Related U.S. Application Data

(62) Division of application No. 10/314,252, filed on Dec. 9, 2002, now Pat. No. 6,885,413.

(30) Foreign Application Priority Data

Dec. 20, 2001  (KR) .............................. 2001-81803

(51) Int. Cl.
*G02F 1/1333* (2006.01)
(52) U.S. Cl. ..................... 349/110; 349/114; 349/73
(58) Field of Classification Search .................. None
See application file for complete search history.

(56) References Cited

U.S. PATENT DOCUMENTS 6,466,292 B1 * 10/2002 Kim ........................ 349/143
6,498,634 B1 * 12/2002 Yamazaki et al. .......... 349/141

* cited by examiner

*Primary Examiner*—Andrew Schechter
*Assistant Examiner*—Richard Kim
(74) *Attorney, Agent, or Firm*—McKenna Long & Aldridge LLP

(57) ABSTRACT

A liquid crystal display having two display surfaces includes a first substrate supporting a first thin film transistor array and a first color filter array, and a second substrate supporting a second color filter array facing the first thin film transistor array and a second thin film transistor facing the first color filter array, and a layer of liquid crystal material provided between the first and second substrates.

7 Claims, 6 Drawing Sheets

LIQUID CRYSTAL DISPLAY WITH TWO SURFACE DISPLAY FUNCTION

This application is a divisional application of U.S. patent application Ser. No. 10/314,252 filed Dec. 9, 2002 now U.S. Pat. No. 6,885,413 which claims the benefit of Korean Patent Application No. 2001-81803, filed on Dec. 20, 2001, each of which is hereby incorporated by reference for all purposes as if fully set forth herein.

BACKGROUND OF THE INVENTION

1. Field of the Invention

This invention relates to a liquid crystal display, and more particularly to a liquid crystal display having two display surfaces.

2. Description of the Related Art

Owing to their capability to be manufactured in small sizes, minimized thickness, and consume low amounts of power, flat panel display devices such as liquid crystal displays are used in portable computers such as notebook PCs, office automation equipment, and other audio/video devices. Liquid crystal displays control electric fields applied to liquid crystal material having anisotropic dielectric properties and selectively transmit light to display images. Unlike other display devices that are capable of generating light (e.g., electro-luminescence devices (EL), cathode ray tubes (CRT), light emitting diodes (LED), etc.), liquid crystal displays, by themselves typically do not generate light.

Accordingly, liquid crystal displays require external light sources to generate light. Liquid crystal displays can be classified as transmission-type and reflection-type devices, depending on the type of external light source used. Transmission-type liquid crystal displays typically include a backlight unit arranged against a rear transparent substrate. Light generated by the backlight unit is transmitted through the rear transparent substrate and guided through a second transparent substrate to a display surface via liquid crystal material. In reflection-type liquid crystal displays, a reflective surface is typically formed on the rear substrate such that external light is reflected from the reflective surface to the display surface via the liquid crystal material.

Referring to FIG. 1, a liquid crystal display panel used in a transmission-type liquid crystal display device includes an upper substrate 10 and a lower substrate 12. The upper substrate 10 supports components including color filters, a common electrode, a black matrix layer, etc. The lower substrate 12 supports components including signal lines (e.g., data lines and gate lines) and thin film transistors (TFTs) formed at crossings of the gate and data lines. TFTs switch data signals applied to data line to liquid cells in response to a scanning signal (e.g., gate pulse) applied to a gate line. Pixel electrodes are formed at pixel areas arranged between the gate and data lines and a pad area 14, connected to each gate and data line, applies data signals and scanning signals supplied from a driving circuit (not shown) to the gate and data lines, respectively.

Referring to FIG. 2, a TFT fabrication process may be performed as follows. First, gate electrode 20 and corresponding gate lines are formed by depositing metal such as aluminum Al, molybdenum Mo, chrome Cr, etc., on a glass substrate 18 and patterning the deposited metal by photolithography. A gate insulation film 22 is formed by depositing an inorganic film such as silicon nitride SiNx on the glass substrate 18 where the gate electrode 20 is formed. A semiconductor layer 24 of amorphous silicon (a-Si) and an ohmic contact layer 26 of a-Si doped with n+ ions are sequentially formed on the gate insulation film 22. A source electrode 28 and a drain electrode 30 are formed on the ohmic contract layer 26 by depositing a metal such as molybdenum Mo, chrome Cr, etc. The source electrode 28 is subsequently patterned and integrated with a corresponding data line. A portion of the ohmic contact layer 26 exposed within an aperture between the source electrode 28 and the drain electrode 30 is typically removed via a dry or wet etching process. Next, a protective film 32 made of silicon nitride SiNx or silicon oxide SiOx is deposited over the entire surface of the glass substrate 18 so as to cover the TFT. A contact hole is then formed in the protective film 32 and a pixel electrode 34 made of indium tin oxide (ITO) is deposited in the contact hole to electrically connect to the drain electrode 30.

TFTs selectively supply video signals to each of their corresponding liquid crystal cells based on a gate signal applied to their corresponding gate lines. Accordingly, the transmittance of light, within a liquid crystal cell, generated by a backlight may be controlled so that the liquid crystal display can display images.

FIG. 3 illustrates a sectional view of a liquid crystal display having two display surfaces.

Referring to FIG. 3, liquid crystal displays having two display surfaces typically include a first liquid crystal display panel 40 having a first set of two substrates bonded together, a first backlight unit 42 for transmitting light to the first liquid crystal display panel 40, a first liquid crystal display module including a first pad area 44, to which a driver (not shown) is connected for driving liquid crystal cells of the first liquid crystal display panel 40, a second liquid crystal display panel 50 having a second set of two substrates bonded together, a second backlight unit 52 for transmitting light to the second liquid crystal display panel 50, and a second liquid crystal display module including a second pad area 54, to which a driver (not shown) is connected for driving liquid crystal cells of the second liquid crystal display panel 50.

Liquid crystal displays having two display surfaces are capable of displaying first images in a first direction on a first display surface via the first liquid crystal display module and displaying second images in a second direction on a second display surface via the second liquid crystal display module.

Use of liquid crystal display devices such as those illustrated in FIG. 3 is disadvantageous, however, because two liquid crystal display modules are required to display the first and second images on the first and second display surfaces. Accordingly, liquid crystal display devices such as those illustrated in FIG. 3 tend to be undesirably thick.

SUMMARY OF THE INVENTION

Accordingly, the present invention is directed to a liquid crystal display having two display surfaces that substantially obviates one or more of the problems due to limitations and disadvantages of the related art.

An advantage of the present invention provides a liquid crystal display having two display surfaces, wherein the liquid crystal display is capable of displaying images on display surfaces facing two different (e.g., opposing) directions.

Additional features and advantages of the invention will be set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display having two display surfaces may include a first substrate having a first thin film transistor array and a first color filter array, and a second substrate having a second color filter array facing the first thin film transistor array and having a second thin film transistor array facing the first color array, and a liquid crystal layer arranged between the first and second substrates.

In one aspect of the present invention, the liquid crystal display having two display surfaces may include a first pad area formed at one side of the first substrate and a second pad area formed at one side of the second substrate.

In another aspect of the present invention, the first and second pad areas may each be connected to the first and second thin film transistor arrays, respectively, for applying driving signals supplied from a driver to the first and second thin film transistor arrays, respectively.

In yet another aspect of the present invention, the liquid crystal display having two display surfaces may be provided as a transmission-type or semi-transmission-type liquid crystal display.

In still another aspect of the present invention, the liquid crystal display having two display surfaces may include a first backlight unit arranged at a rear of the first thin film transistor array and a second backlight unit arranged at a rear of the second thin film transistor array.

In still another aspect of the present invention, the liquid crystal display having two display surfaces may be provided as a reflection-type liquid crystal display.

In yet another aspect of the present invention, the liquid crystal display having two display surfaces may include a first reflection plate arranged at a rear of the first thin film transistor array and a second reflection plate arranged at a rear of the second thin film transistor array.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, examples of which are illustrated in the accompanying drawings.

Figure 4:
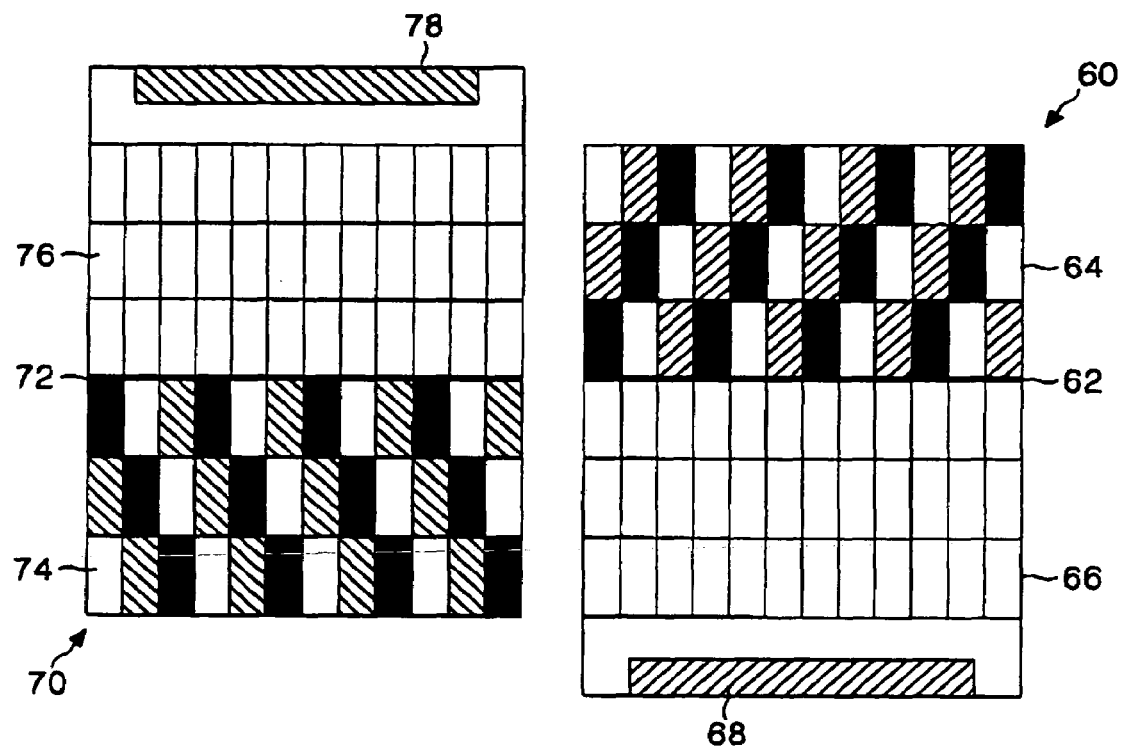
FIG. 4 illustrates a plan view of an upper substrate and a lower substrate of a liquid crystal display having two display surfaces in accordance with one aspect of the present invention.

Referring to FIG. 4, in accordance with an aspect of the present invention, a liquid crystal display having two display surfaces may be provided as a transmission-type or semi-transmission-type liquid crystal display. Accordingly, the liquid crystal display may, for example, include a first transparent substrate 60 supporting a first thin film transistor (TFT) array 66 and a first color filter array 64, wherein a first black matrix layer 62 is formed at a boundary of the first color filter array 64 and the first TFT array 66, and a second transparent substrate 70 supporting a second TFT array 76 and a second color filter array 74, wherein a second black matrix layer 72 is formed at a boundary of the second color filter array 74 and the second TFT array 76. The first and second black matrix layers 62 and 72, respectively, prevent a leakage of light from between the first TFT array 66 and the first color filter array 64 and from between the second TFT array 76 and the second color filter array 74, respectively.

Signal lines (e.g., data lines and gate lines) may be formed in the first and second TFT arrays 66 and 76, respectively, and thin film transistors (TFTs) may be formed at crossings of the gate and data lines. Each TFT may respond to a scanning signal (e.g., a gate pulse) supplied from a corresponding gate line by switching a data signal applied to a data line to a corresponding liquid crystal cell. A pixel electrode may be formed at a pixel area arranged between the gate and data lines. A color filter, common electrode, a black matrix layer, etc. may be formed in the first and second color filter arrays 64 and 74, respectively.

In one aspect of the present invention, a first pad area 68 may be formed on one side of the first substrate 60. Gate and data lines of the first TFT array 66 may be connected to the first pad area 68 such that data signals and scanning signals generated from a driving circuit (not shown) may be applied to the gate and data lines.

In another aspect of the present invention, a second pad area 78 may be formed in one side of the second substrate 70. Gate and data lines of the second TFT array 76 may be connected to the second pad area 78 such that data signals and scanning signals generated from a driving circuit (not shown) may be applied to the data lines and the gate lines respectively.

The first and second substrate 60 and 70, respectively, may be bonded together and separated by a layer of liquid crystal display material (not shown). In one aspect of the present invention, the first TFT array 66 may be arranged to face the second color filter array 74 and the first color filter array 64 may be arranged to face the second TFT array 76.

Figure 5:
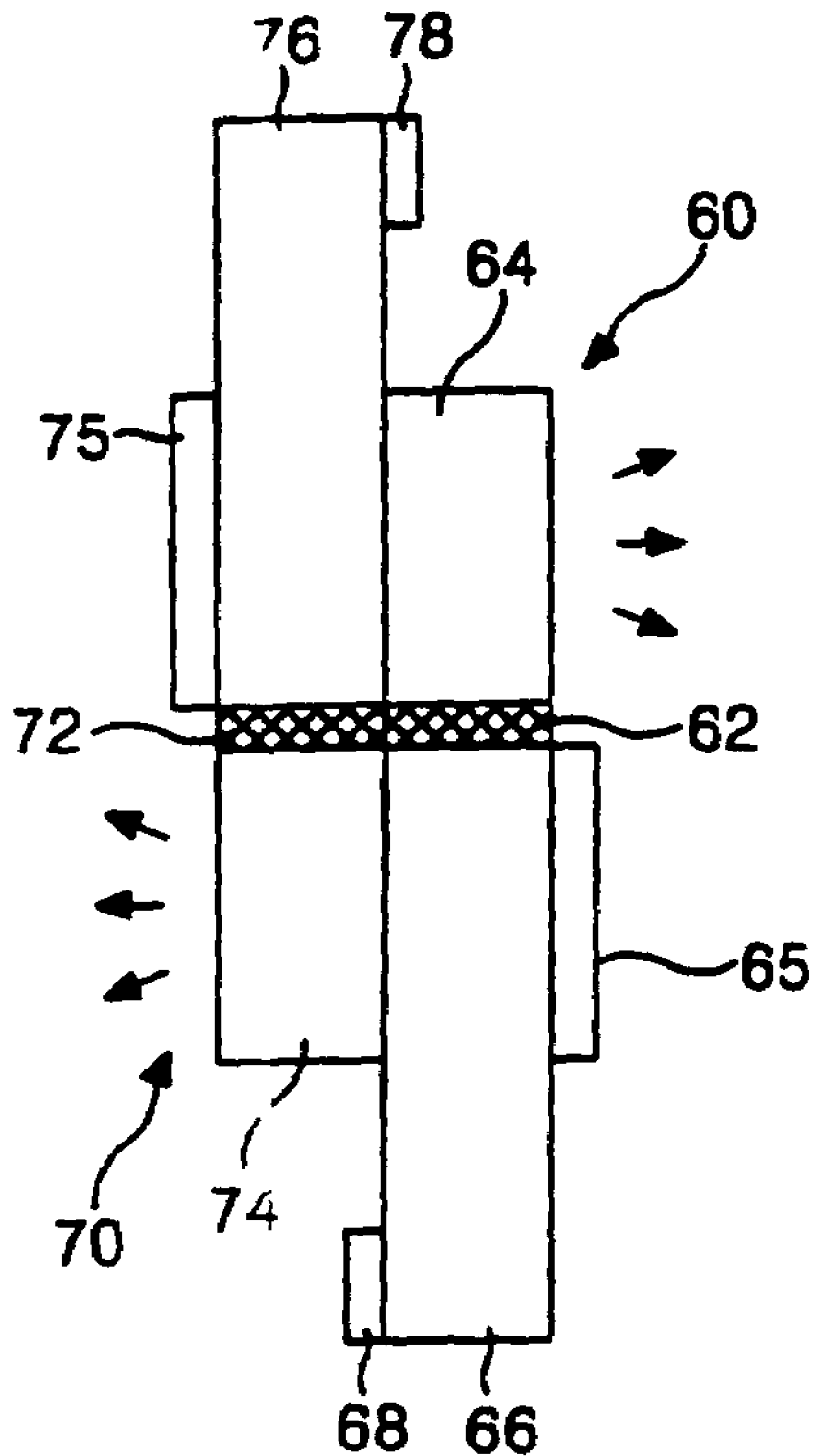
FIG. 5 illustrates a sectional view of the liquid crystal display having two display surfaces in accordance with one aspect of the present invention.

Referring to FIG. 5, in accordance with one aspect of the present invention, the liquid crystal display having two display surfaces may be provided as a transmission-type or semi-transmission-type liquid crystal display. Accordingly, video data and scanning signals may be applied from a driver (not shown) to the first and second TFT arrays 66 and 76, respectively, via the first and second pad areas 68 and 78, respectively. In one aspect of the present invention, video data applied to the first TFT array 66 may enable transmittance characteristics of the layer of liquid crystal material to be controlled such that light generated by a first backlight unit 65 may be selectively transmitted along a first direction through the second color filter array 74 and a first image may be displayed on a first display surface of the second substrate 70. Similarly, video data applied to the second TFT array 76 may enable transmittance characteristics of the layer of liquid crystal material to be controlled such that light generated by a second backlight unit 75 may be selectively transmitted along a second direction through the first color filter array 64 and a second image may be displayed on a second display surface of the first substrate 60.

Figure 6:
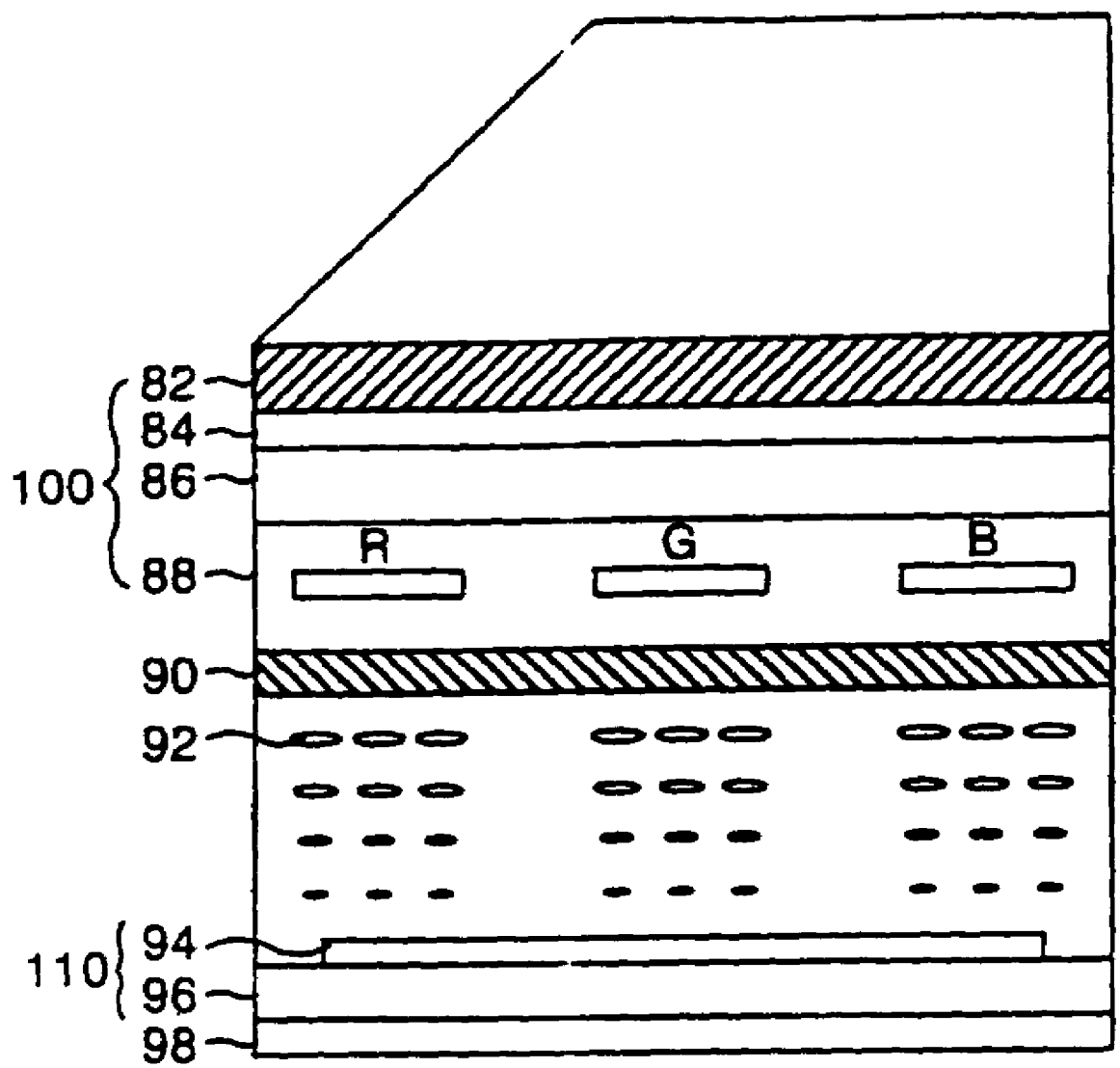
FIG. 6 illustrates a diagram of a reflection type liquid crystal display.

FIG. 6 illustrates a sectional view of a reflection-type liquid crystal display having two display surfaces according to another aspect of the present invention.

Referring to FIG. 6, a reflection-type liquid crystal display in accordance with the present aspect of the invention may, for example, include a polarizer 82 for polarizing natural light into linearly polarized light, a phase plate 84 for converting the linear polarized light into circularly polarized light, a first glass substrate 86 for transmitting the circularly polarized light, an upper substrate 100, a color filter 88 including red, green, and blue filters, formed on the upper substrate 100, a plurality of pixel electrodes 90 formed over the entire surface of the color filter 88, a layer of liquid crystal material 92 for converting the circularly polarized light into linearly polarized light, a lower substrate 110 including signal lines (e.g., gate lines and data lines) and a plurality of TFTs formed at crossings of the gate and data lines (not shown) formed on a second glass substrate 96, and a reflection plate 94 for reflecting the light transmitted by the layer of liquid crystal material 92.

In one aspect of the present invention, an applied voltage drives the reflection-type liquid crystal display shown in FIG. 6. Further, light (e.g., a mix of natural light and surrounding light) incident on the reflection type liquid crystal display) may be transmitted through the polarizer 82 and converted into linearly polarized light having a first polarization direction. The linearly polarized light transmitted through the polarizer 82 is then converted into left circularly polarized light (i.e., light having an electric field vector rotating about an axis of propagation in a counter-clockwise direction) by the phase plate 84 and transmitted through the first glass substrate 86.

The left circularly polarized light transmitted through the first glass substrate 86 is transmitted as left circularly polarized light having a specific wavelength when it is transmitted through the color filter 88 (e.g., an absorption-type color filter) including red, green, and blue filters. If the left circularly polarized light transmitted through the color filter 88 is transmitted through the liquid crystal layer 92, the left circularly polarized light is transformed into linearly polarized light having a second polarization direction, perpendicular to the first polarization direction. The reflection plate 98 reflects the linearly polarized light having the second polarization direction back into the layer of liquid crystal material 92. The layer of liquid crystal material 92 converts the linearly polarized light having the second polarization direction into left circularly polarized light and transmits the converted light through the color filter 88. The left circularly polarized light transmitted through the color filter 88 is then converted into linearly polarized light having the first polarization direction via phase plate 84. The linearly polarized light is converted such that it is transmitted through the polarizer 82 to display a specific color.

Figure 7:
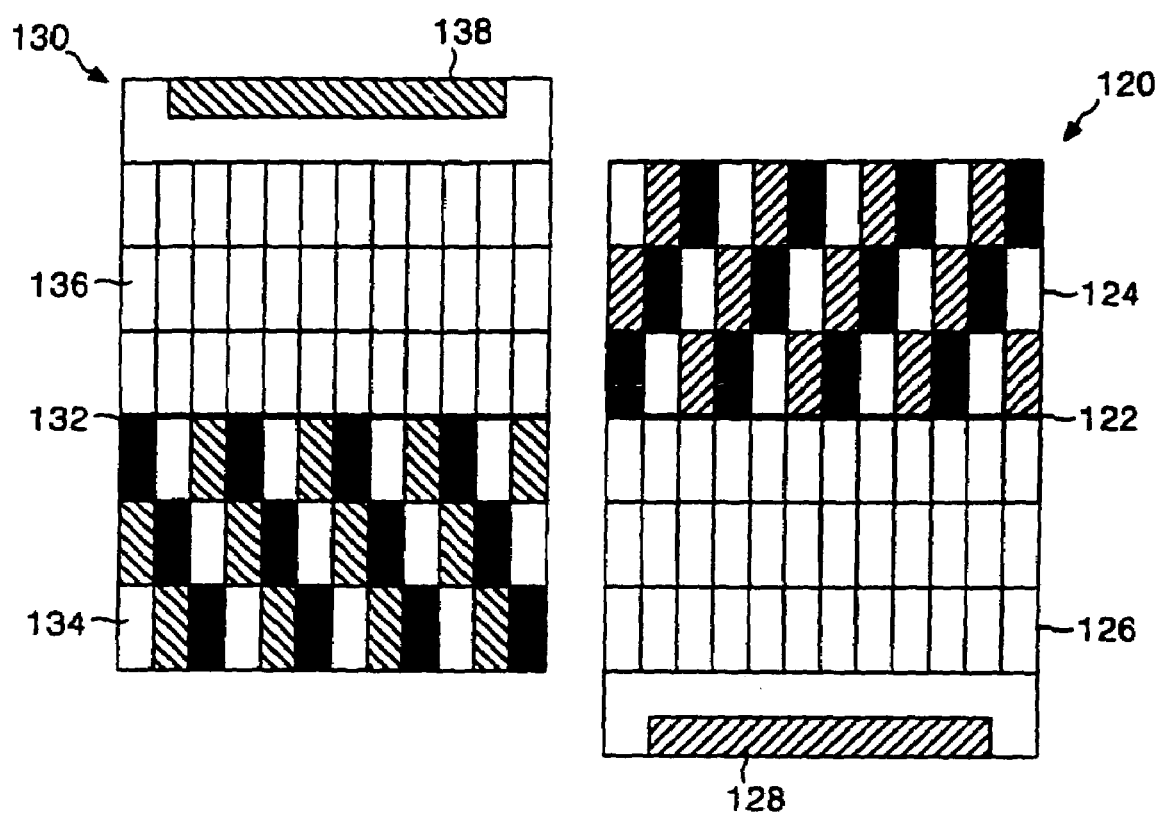
FIG. 7 illustrates a plan view of un upper substrate and a lower substrate of a liquid crystal display having two display surfaces in accordance with another aspect of the present invention.

Referring to FIG. 7, in accordance with an aspect of the present invention, the liquid crystal display having two display surfaces may be provided as a reflection-type liquid crystal display. Accordingly, the liquid crystal display may, for example, include a first transparent substrate 120 supporting a first thin film transistor (TFT) array 126 and a first color filter array 124, wherein a first black matrix layer 122 is formed at a boundary of the first color filter array 124 and the first TFT array 126, and a second transparent substrate 130 supporting a second TFT array 136 and a second color filter array 134, wherein a second black matrix layer 132 is formed at a boundary of the second color filter array 134 and the second TFT array 136. The first and second black matrix layers 122 and 132, respectively, prevent a leakage of light from between the first TFT array 126 and the first color array 124 and from between the second TFT array 136 and the second color filter array 134, respectively.

Signal lines (e.g., data line and gate lines) may be formed in the first and second TFT arrays 126 and 136, respectively, and thin film transistors (TFTs) may be formed at crossings of the gate and data lines. Each TFT may respond to a scanning signal (e.g., a gate pulse) supplied from a corresponding gate line by switching a data signal applied to a data line to a corresponding liquid crystal cell. A pixel electrode may be formed at a pixel area arranged between the gate and data lines.

In one aspect of the present invention, the first and second color filter arrays 124 and 134, respectively, may include a polarizer such as polarizer 82 shown in FIG. 6 for polarizing natural light into linearly polarized light, a phase plate such as phase plate 84 shown in FIG. 6 for converting the linearly polarized light into circularly polarized light, a first glass substrate such as the first glass substrate 86 shown in FIG. 6 for transmitting the circularly polarized light, a color filter such as the color filter 88 shown in FIG. 6, where red, green, and blue filters are arranged, and pixel electrodes such as pixel electrodes 90 shown in FIG. 6 formed on the entire surface of the color filter 88.

In one aspect of the present invention, a first pad area 128 may be formed on one side of the first substrate 120. Gate and data lines of the first TFT array 126 may be connected to the first pad area 128 such that data signals and scanning signals generated from a driving circuit (not shown) may be applied to the gate and data lines.

In another aspect of the present invention, a second pad area 138 may be formed on one side of the second substrate 130. Gate and data lines of the second TFT array 136 may be connected to the second pad area 138 such that data signals and scanning signals generated from a driving circuit (not shown) may be applied to the gate and data lines.

The first and second substrates 120 and 130, respectively, may be bonded together and may be separated by a layer of liquid crystal display material (not shown). In one aspect of the present invention, the first TFT array 126 may be arranged to face the second color filter array 134 and the first color filter array 124 may be arranged to face the second TFT array 136.

Figure 8:
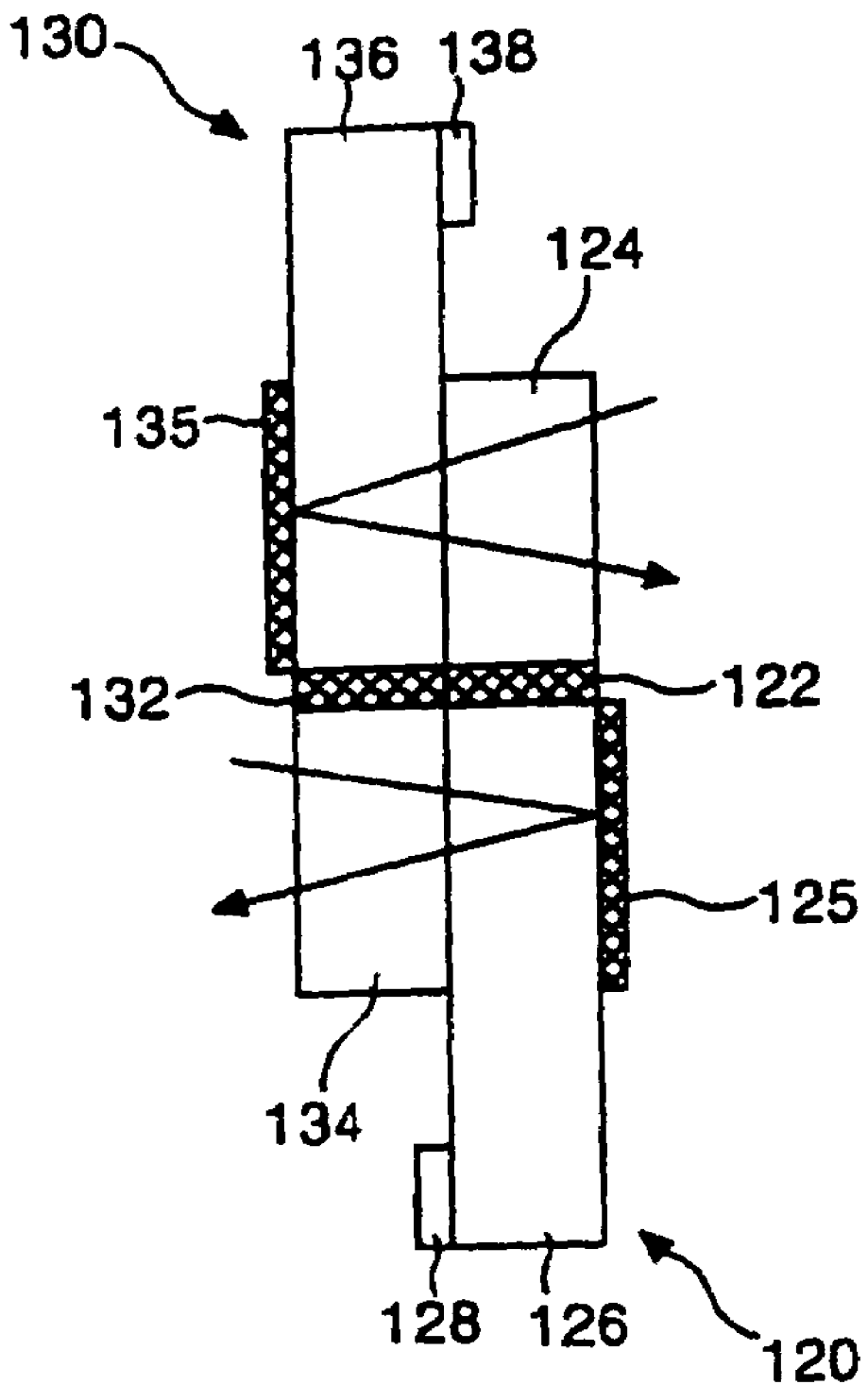
FIG. 8 illustrates a sectional view of liquid crystal display having two display surfaces in accordance with another aspect of the present invention.

Referring to FIG. 8, in accordance with one aspect of the present invention, the liquid crystal display having two display surfaces may be provided as a reflection-type liquid crystal display. Accordingly, video data and scanning signals may be supplied from a driver (not shown) to the first and second TFT arrays 126 and 136, respectively, via the first and second pad areas 128 and 138, respectively. In one aspect of the present invention, video data applied to the first TFT array 126 may enable transmittance characteristics of the layer of liquid crystal material to be controlled such that light reflected by a first reflection plate 125 may be selectively transmitted along a first direction through the second color filter array 134 and a first image may be displayed on a first display surface of the second substrate 130. Similarly, video data applied to the second TFT array 136 may enable transmittance characteristics of the layer of liquid crystal material to be controlled such that light reflected by a second reflection plate 135 may be selectively transmitted along a second direction through the first color filter array 124 and a second image may be displayed on a second display surface of the first substrate 120.

Figure 1:
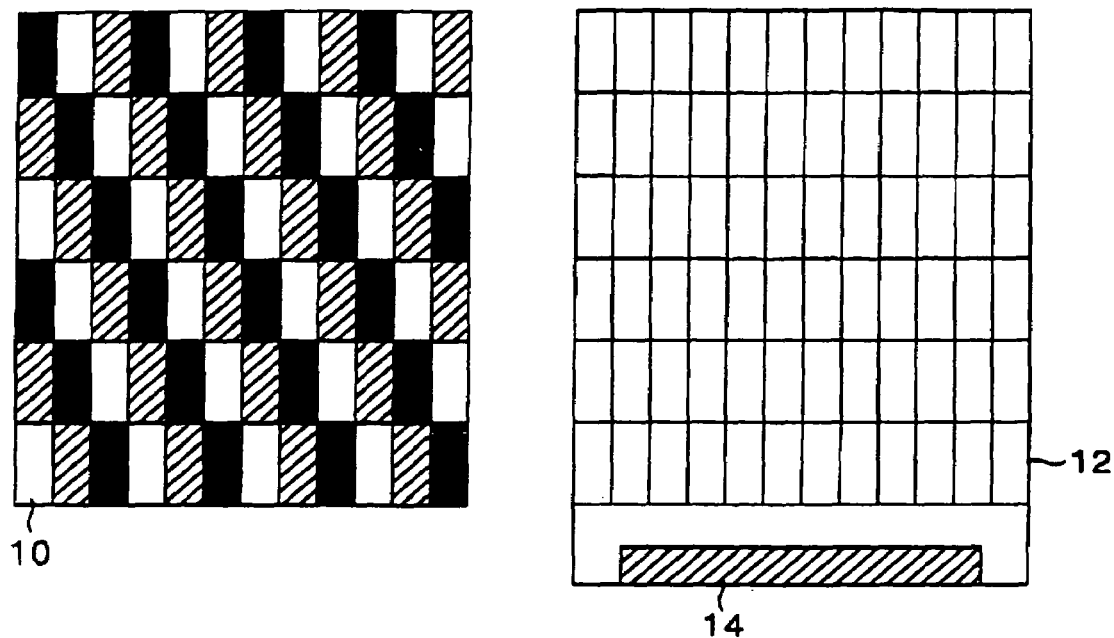
FIG. 1 illustrates a plan view of an upper substrate and a lower substrate of a liquid crystal display of the related art.
Figure 2:
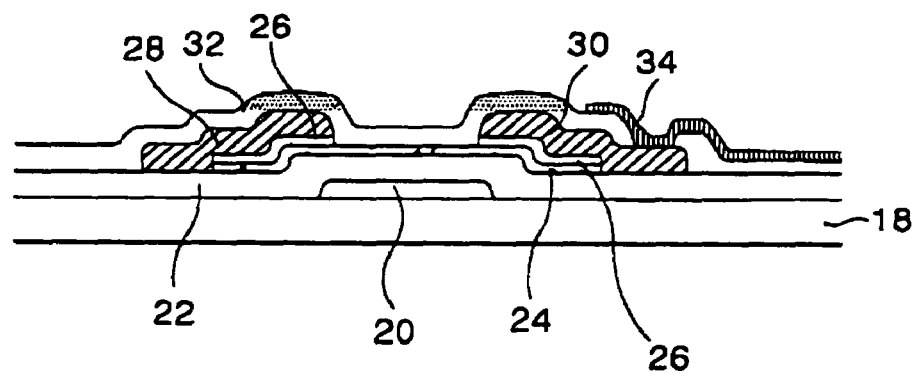
FIG. 2 illustrates a sectional view of a thin film transistor shown in FIG. 1.
Figure 3:
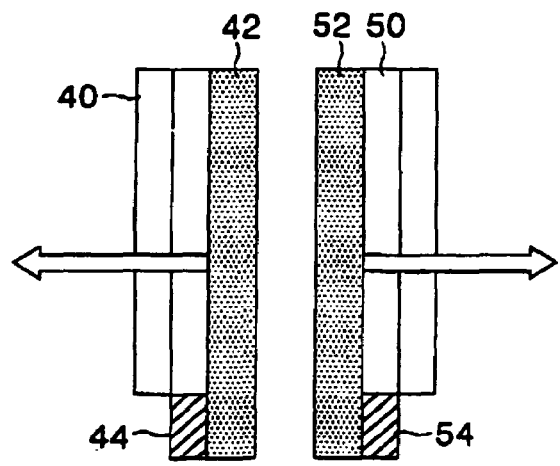
FIG. 3 illustrates a sectional view of a related art liquid crystal display having two display surfaces.

As described above, a liquid crystal display having two display surfaces may generally include a first substrate divided in two portions, wherein a first portion includes a TFT array and a second portion includes a color filter array, and a second substrate, facing the first substrate and also divided into the first and second portions. In one aspect of the present invention, the first and second substrates are bonded together such that the first portion of one substrate faces the second portion of the other and vice versa. Accordingly, the liquid crystal display having two display surfaces is capable of displaying images in two directions and has a reduced thickness compared to liquid crystal displays such as those illustrated in FIG. 3.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate having a first display surface;
   a second substrate having a second display surface opposing the first display surface;
   a layer of liquid crystal material contacting both the first and second substrates, wherein images are displayable by both the first and second display surfaces;
   a first array arranged on the first substrate;
   a second array arranged on the second substrate, wherein the first array is substantially aligned with the second display surface and the second array is substantially aligned with the first display surface;
   a first black matrix layer arranged on the first substrate; and
   a second black matrix layer arranged on the second substrate, wherein the first and second black matrix layers substantially overlap each other.

2. The liquid crystal display according to claim 1, further comprising:
   a first pad area arranged at one side of the first substrate and connected to a first thin film transistor array for supplying a driving signal from a driver; and
   a second pad area arranged at one side of the second substrate and connected to a second thin film transistor array for supplying a driving signal from a driver.

3. The liquid crystal display according to claim 2, further comprising:
   a first reflection plate arranged at a rear of the first thin film transistor array; and a second reflection plate arranged at a rear of the second thin film transistor array.

4. The liquid crystal display according to claim 1, wherein the liquid crystal display is a transmission-type liquid crystal display.

5. The liquid crystal display according to claim 1, wherein the liquid crystal display is a semi-transmission-type liquid crystal display.

6. The liquid crystal display according to claim 1, further comprising:
   a first backlight unit arranged at a rear of the first thin film transistor array; and
   a second backlight unit arranged at a rear of the second thin film transistor array.

7. The liquid crystal display according to claim 1, wherein the liquid crystal display is a reflection-type liquid crystal display.

* * * * *